United States Patent
Knaappila et al.

(10) Patent No.: US 9,609,464 B2
(45) Date of Patent: Mar. 28, 2017

(54) METHOD AND TECHNICAL EQUIPMENT FOR SHORT RANGE DATA TRANSMISSION

(71) Applicant: Silicon Laboratories Finland Oy, Espoo (FI)

(72) Inventors: Jere Knaappila, Evitskog (FI); Riku Mettala, Helsinki (FI)

(73) Assignee: Silicon Laboratories Finland Oy, Espoo (FI)

( * ) Notice: Subject to any disclaimer, the term of this patent is extended or adjusted under 35 U.S.C. 154(b) by 0 days.

(21) Appl. No.: 14/660,473

(22) Filed: Mar. 17, 2015

(65) Prior Publication Data

US 2015/0271629 A1 Sep. 24, 2015

(30) Foreign Application Priority Data

Mar. 18, 2014 (FI) .................................. 20145251 U (51) Int. Cl.
| | |
|---|---|
| *H04B 7/00* | (2006.01) |
| *H04W 4/00* | (2009.01) |
| *H04W 4/08* | (2009.01) |
| *H04W 8/00* | (2009.01) |
| *H04B 1/00* | (2006.01) |

(52) U.S. Cl.
CPC .............. *H04W 4/008* (2013.01); *H04W 4/08* (2013.01); *H04W 8/005* (2013.01)

(58) Field of Classification Search
CPC ..... H04W 4/008; H04W 8/005; H04W 84/18; H04W 84/20

USPC ................................ 455/41.2–41.3, 410–411
See application file for complete search history.

(56) References Cited

U.S. PATENT DOCUMENTS

| | | |
|---|---|---|
| 2013/0090061 A1 | 4/2013 | Linde |
| 2013/0109323 A1 | 5/2013 | Ruutu et al. |
| 2013/0165044 A1 | 6/2013 | Xie et al. |
| 2013/0326495 A1 | 12/2013 | Reunamaki et al. |

FOREIGN PATENT DOCUMENTS

| | | |
|---|---|---|
| EP | 1873982 A2 | 1/2008 |
| EP | 2400714 A1 | 12/2011 |
| GB | 2494758 | 3/2013 |
| WO | WO2013/181778 A1 | 12/2013 |

OTHER PUBLICATIONS

Search Report, EP15397510.7, Jun. 19, 2015, 2 pgs.
Search Report, FI20145251, Oct. 22, 2014, 2 pgs.

*Primary Examiner* — Lee Nguyen
(74) *Attorney, Agent, or Firm* — Egan Peterman Enders Huston (57) ABSTRACT

A method, an apparatus and a computer program product are used for device filtering. A packet is received from a device, after which it is determined whether the device is allowed to be responded to, wherein the determination comprises at least one of the following: determining a received signal strength indication from the packet; or determining a time from previous connection of the device; or determining the data in a payload of the packet.

23 Claims, 8 Drawing Sheets

METHOD AND TECHNICAL EQUIPMENT FOR SHORT RANGE DATA TRANSMISSION

This application claims priority to co-pending Finnish patent application serial number 20145251 filed on Mar. 18, 2014, the disclosure of which is incorporated herein by reference in its entirety for all purposes.

TECHNICAL FIELD

The present application relates to Bluetooth modules. In particular the present application relates to Bluetooth low energy.

BACKGROUND

Bluetooth Low Energy (BLE) relates to Bluetooth wireless radio technology. It has been designed for low-power and low latency applications for wireless devices within short range. Today, BLE applications can be found from healthcare, fitness, security, smart energy, industrial automation and home entertainment. However, BLE is not limited only those, but increasingly more new application utilizing BLE technology are designed.

The difference between BLE and classic Bluetooth is that the BLE devices consume remarkably less power for communication than classic Bluetooth devices. In addition, the BLE is able to start the data transmission much quicker than the classic Bluetooth. This makes it possible to have BLE devices constantly on and to communicate intermittently with other devices.

In certain cases, there is a need to filter devices to which responses are sent.

SUMMARY

Now there has been invented an improved method and technical equipment implementing the method, by which the above problems are alleviated. Various aspects of the invention include a method, an apparatus, a computer program product, which are characterized by what is stated in the independent claims. Various embodiments of the invention are disclosed in the dependent claims.

According to a first aspect, there is provided a method, comprising receiving a packet from a device; determining whether the device is allowed to be responded to, wherein the determination comprises at least one of the following: determining a received signal strength indication from the packet; or determining a time from previous connection of the device; or determining the data in a payload of the packet.

According to a second aspect, there is provided an apparatus comprising at least processing means and memory means, wherein the apparatus is configured to receive a packet from a device; determine whether the device is allowed to be responded to, wherein the determination comprises at least one of the following: determining a received signal strength indication from the packet; or determining a time from previous connection of the device; or determining the data in a payload of the packet.

According to a first aspect, there is provided a computer program product embodied on a computer readable medium, comprising computer program code configured to, when executed on at least one processor, cause an apparatus to: receive a packet from a device; determine whether the device is allowed to be responded to, wherein the determination comprises at least one of the following: determining a received signal strength indication from the packet; or determining a time from previous connection of the device; or determining the data in a payload of the packet.

According to an embodiment, the device is a scanning device.

According to an embodiment, the packet is a scan request or connection request.

According to an embodiment, the device is an advertising device.

According to an embodiment, the packet is an advertisement packet.

According to an embodiment, the device is Bluetooth Low Energy device.

According to an embodiment, the determined received signal strength indication is used for determining a distance.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of device filtering in BLE. It is to be noted, however, that the invention is not limited to only this radio transmission technology. In fact, the different embodiments have applications in different environments.

Figure 1:
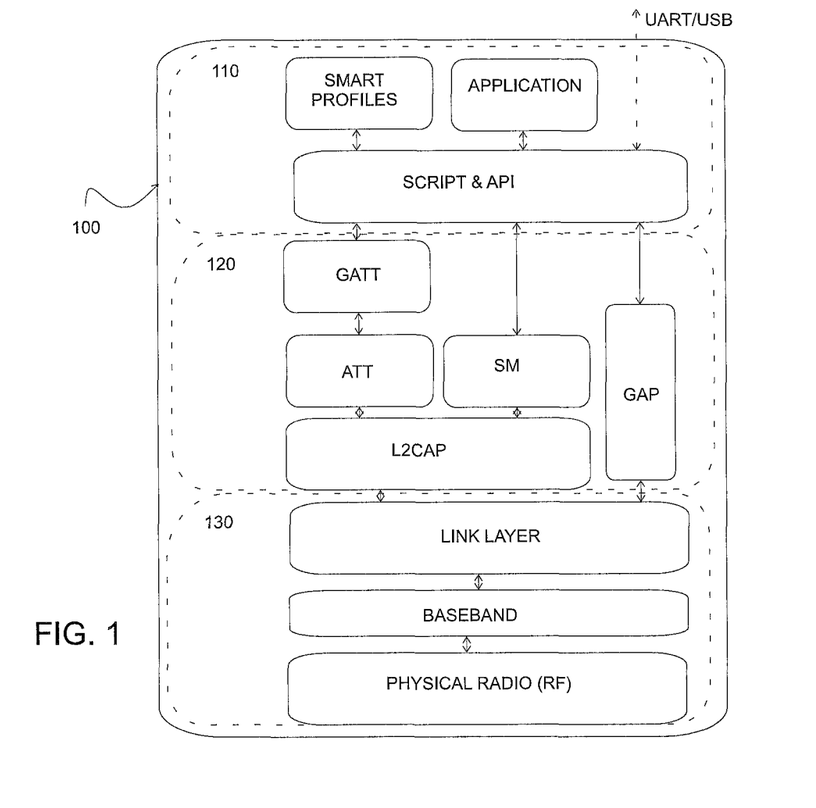
FIG. 1 shows a Bluetooth module according to an embodiment.

FIG. 1 illustrates an example of an electronic apparatus 100. According to an embodiment, the apparatus 100 is a Bluetooth module that comprises application layer 110, host layer 120 and a Bluetooth (or BLE) controller 120. The application layer 110 comprises the apparatus related application(s) (e.g. heart rate, proximity, blood pressure, time update, temperature, battery, . . . ), smart profiles, script and application programming interface (API). The application is capable of reading sensor data e.g. from heart rate sensor, and reporting the data to host layer for transmitting the data by means of the Bluetooth (or BLE) controller 130. The host layer 120 comprises protocols running over the connection. Host layer 120 also comprises data to be used in advertisement profile (GATT), generic access profile (GAP), attribute protocol (ATT), security manager (SM) and logical link control and adaptation protocol (L2CAP). The Bluetooth (or BLE) controller 130 comprises link layer, baseband and physical layer (i.e. physical radio, radio frequency RF).

The link layer provides ultra-low power idle mode operation and device discovery (i.e. connection mode and advertising mode handling). The link layer also is in charge for packet transmission and responding.

Figure 2:
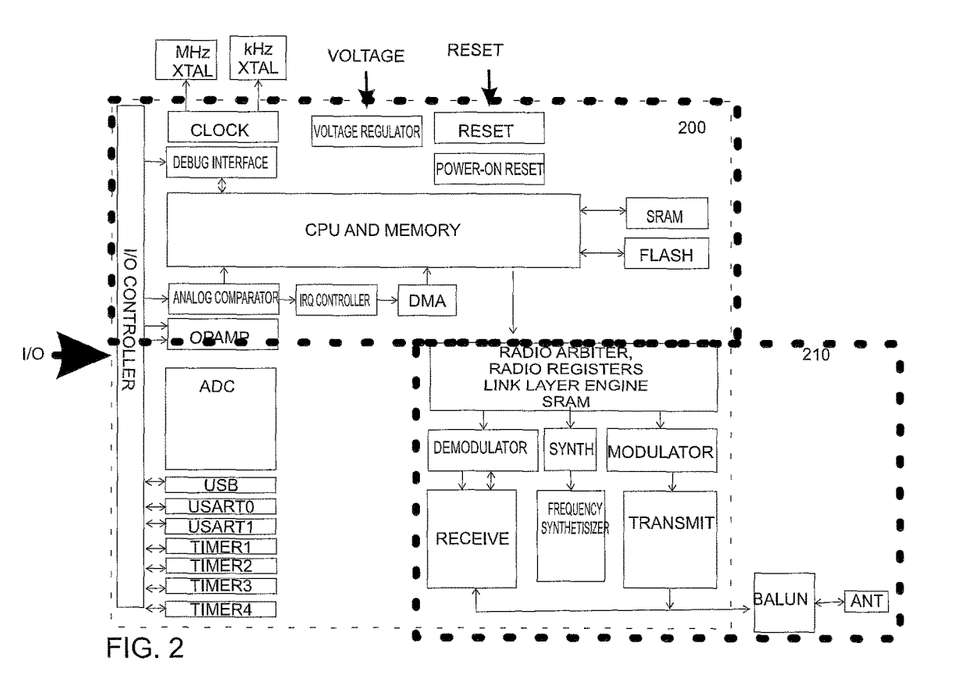
FIG. 2 shows a simplified block chart of a Bluetooth module.

FIG. 2 illustrates an example of a BLE module available on the market as a simplified block diagram. Central processing unit and memory means with application data are located in segment 200. A part of the link layer and physical layer are illustrated with reference 210. This segment 210 contains elements, such as radio registers, link layer engine, modulator-demodulator, receiving-transmitting means, frequency synthesizer, balancing-unbalancing unit (balun), antenna (ant).

In BLE technology one or more slave devices can be connected to a master device. The master is able to communicate with one or more slave devices, also simultaneously. To let the master know about the slave devices, the slave devices (or at that point "advertisers") periodically, at pseudo-random intervals, pass advertisement packets which a master device (also known as scanner device i.e. "scanner") is scanning.

Advertisement packet types from slave device are
ADV_IND connectable undirected advertising event
ADV_DIRECT_IND connectable directed advertising event
ADV_NONCONN-IND non-connectable undirected advertising event
ADV_DISCOVER_IND discoverable undirected advertising event Response packets from the master device to the advertisement packets are
SCAN_REQ scan request for further information from advertiser
CONNECT_REQ connect request by initiator, i.e. from the master device.

When an advertising device receives SCAN_REQ packet from a scanning device, the advertising device may give more information to the scanning device by SCAN_RSP packet. SCAN_RSP packet may contain information on the name of the advertising device and on the services the advertising device is able to provide. However, SCAN_RSP packet is not limited to carry only this information but may contain other data as well or instead.

Scanning device wishing to connect with the advertising device sends a CONNECT_REQ packet that contains data on e.g. transmit window size defining timing window for first data packet, transmit window offset that is off when the transmit window starts, connection interval is the time between connection events, slave latency defines number of times the slave can ignore connection events from the master, connection timeout is maximum time between two correctly received packets in the connection before link is considered to be lost, hop sequence is a random number appointing the starting point for a hop, channel map, CRC (Cyclic Redundancy Check) initialization value.

When a scanner is connected to an advertiser, the advertiser is called "a slave" and the scanner is called "a master". The state for passing advertisement packets is called "advertising state" and the state for connection is called "connected state". In both states, data transfer occurs. Slave device may be a sensor or an actuator, such as a temperature sensor, heart rate sensor, light bulb, proximity sensor etc. Master device can be any electronic device capable of collecting data, e.g. mobile phone, smart phone, personal digital assistant, personal computer, laptop computer, tablet computer, etc.

Packets sent from a slave device in advertising mode may contain approximately 27 bytes of data and a slave address. Packets from master device in advertisement channel may contain only a master address.

When an advertisement packet is successfully received by the master device, the master device can send a SCAN_REQ packet to the slave device. This SCAN_REQ packet indicates that the master device has received the advertisement data successfully. The SCAN_REQ packet is transmitted from the master device to the slave device in order to request more data.

Figure 3A:
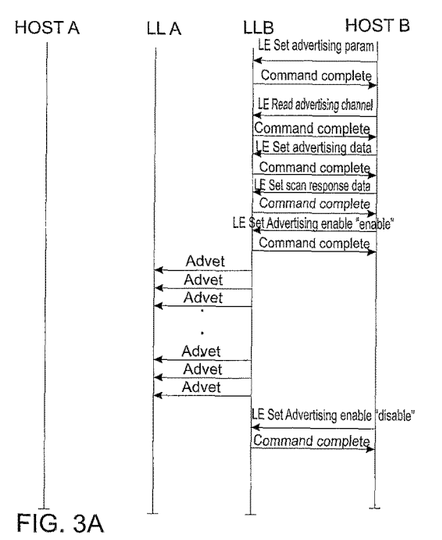
FIGS. 3a-3b shows an example of an advertising mode in a Bluetooth system.
Figure 3B:
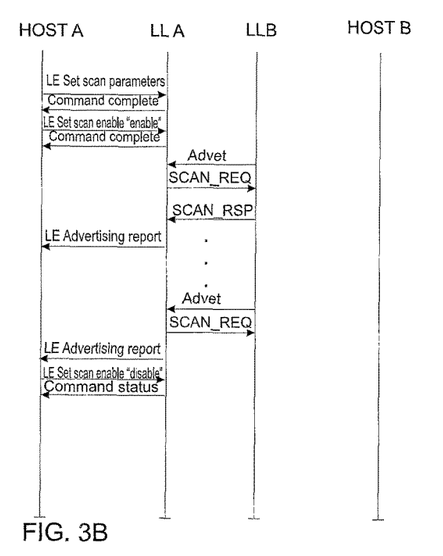

FIGS. 3a-3b illustrate technical background for advertising modes. FIG. 3a illustrates a setup of device B to send advertisement packets. FIG. 3b illustrates a situation, where device B is sending packets and device A wishes to active scan. Host A and host B are a master device and a slave device respectively. LLA is link layer of the master device, i.e. host A, and LLB is link layer of the slave device, i.e. host B. From FIG. 3b it is realized that SCAN_REQ packet from host A as a response to an advertisement packet "Advet" from link layer LLB of host B is transmitted from link layer LLA of host A. As a response to SCAN_REQ packet, the link layer LLB of the host B sends a SCAN_RESP packet with data.

Connection between the master device and the slave device can be formed by the master device sending CONNECT_REQ packet after the slave advertisement packet. When the connection is opened, the slave device becomes aware with which device the connection is formed.

The BLE devices are capable of filter scanning devices to which scan responses are sent and/or connections are formed. Prior to the invention, the device filtering is implemented by using white listing and/or black listing only. White listing defines which devices are allowed to have connection with and to send response to. Black listing defines devices which are not to be connected with or responded to. Black and white lists are updated by an upper layer application. The process of updating the white/black lists should be done before receiving a packet, which means that address in the received packet cannot be used to update the list.

The present embodiments provide a solution, where device filtering is implemented by using extraneous information. According to an embodiment, the extraneous information used for filtering is used together with the Bluetooth address or packet. However, according to another embodiment, only the extraneous information is used for filtering. The extraneous information can relate to a received signal strength or interval between requests or data in payload of the packet.

BLE devices are capable of determining RSSI (Received Signal Strength Indication) to measure a power of the received radio signal. The RSSI can be calculated from packets in advertisement state or connected state. The determined RSSI can be utilized e.g. for determining the distance between two devices according to known algorithms. The determined received signal strength can be used for filtering devices in such a manner, that if—according to the received signal strength—one of the scanning device or the advertising device is too far from the other of the scanning device or the advertising device, such a device may be filtered out.

As another example, if the time phase from the previous connection of the one of the scanning device or the advertising device to the other of the scanning device or the advertising device is too short, i.e. the device was just connected, such a device may be filtered out.

According to an embodiment, the distance being determined according to the received signal strength can be used to define whether a device should be filtered out. For example, if the distance indicates that the scanning device is too far (it is appreciated that "far" depends on a situation. Examples of "far" are 0.5 meters, 2 meters, 5 meters, etc.), according to an embodiment, the advertising device filters the scanning device out. According to another embodiment, if the distance indicates that the advertising device is too far, the scanning device may filter the advertising device out. If the scanning device (/advertising device)—on the other hand—is closer than "far", then scan responses or connection requests (/advertising packets) can be send to (/received from) such device.

According to another embodiment, the advertising or scanning device may comprise a timer that measures the time from a previous connection of a certain device. The timer can be remote device specific or it can be generic to the device. If the timer is generic to the device, it means it is shared with all remote devices. If the timer indicates that the scanning device has just been connected, then such scanning device can be filtered out, and no scan responses are sent to that device or no connection requests are accepted from that device. Another embodiment is from the scanning device's point of view: if the advertising device has just been connected, then such advertising device can be filtered out, and no connection requests or scan requests are sent to that device. The timings are defined by upper layer application requirements. As examples of the preset timing are 1 minute, 5 minutes, 10 minutes, etc.

Yet according to an embodiment, the data in the payload of the packet is determined. For example, the sending device is filtered out, if the data does not have information which the device is interested in. As another example, the sending device is filtered out, if the data has a certain information, which is not interesting or important to the device.

Figure 4:
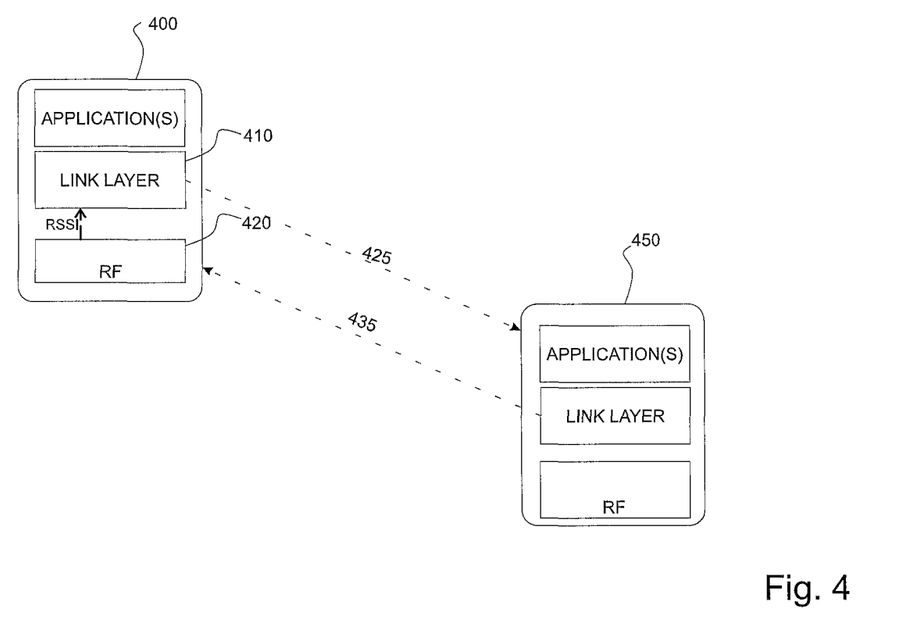
FIG. 4 shows an arrangement according to an embodiment.

An embodiment is disclosed next with respect to FIG. 4. A link layer 410 of an advertising device 400 is advertising by sending an advertising packet 425. A scanning device 450 detects the advertising packet and responds to it by sending either a scan request SCAN_REQ or connection request CONN_REQ 435. Before sending scan response SCAN_RSP or connection response CONN_RSP packet back to the scanning device 450, the advertising device 400 determines whether the scanning device 450 is an allowed device. For determining whether the scanning device is an allowed device, the advertising device may use the white/black list. In addition to or instead of the black/white list, the advertising device 400 further determines a received signal strength RSSI, which can be used for determining a distance to the scanning device 450. If the RSSI indicates that the distance to the scanning device 450 is too long, then no scan response SCAN_RSP is sent to the scanning device or connection response CONN_RSP are accepted from the scanning device 450.

According to another embodiment a link layer of an advertising device 400 is advertising by sending advertising packets. A scanning device 450 may determine whether the advertising device 400 is an allowed device according to white/black list. In addition to or instead of the white/black list, the scanning device 450 determines a received signal strength RSSI, which can be used for determining a distance to the advertising device 400. If the RSSI indicates that the distance to advertising device 400 is too long, then the scanning device 450 sends no scan request SCAN_REQ nor connection request CONN_REQ to the advertising device 400.

Figure 5:
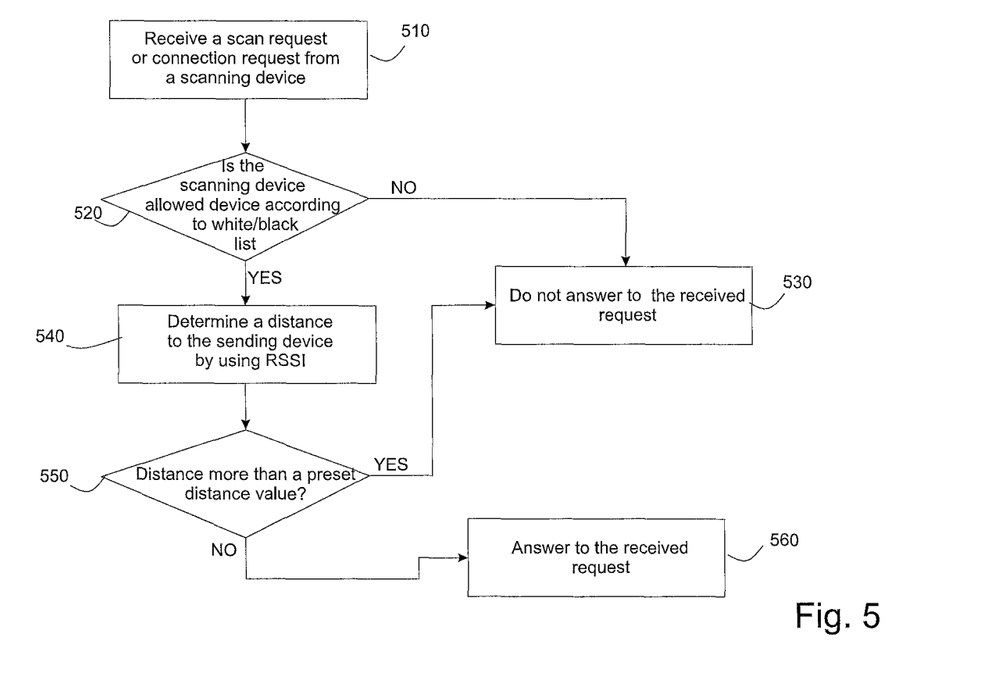
FIG. 5 shows a method according to an embodiment.

FIG. 5 illustrates a flowchart according to the embodiment. In this embodiment, as a response to an advertisement packet, a scan request or connection request is received 510 from a scanning device by an advertising device. The advertising device determines whether or not the scanning device is allowed device according to a white/black list 520. If not 530, the advertising device does not answer the request. If yes 540, then a distance between the advertising device and the scanning device is determined by using received signal strength indication. The determined distance is compared to a preset distance value 550, and if the determined distance exceeds the preset distance value, a respond to the received request is not sent 530. If the determined distance is smaller than the preset distance value, the received request is answered 560.

Figure 6:
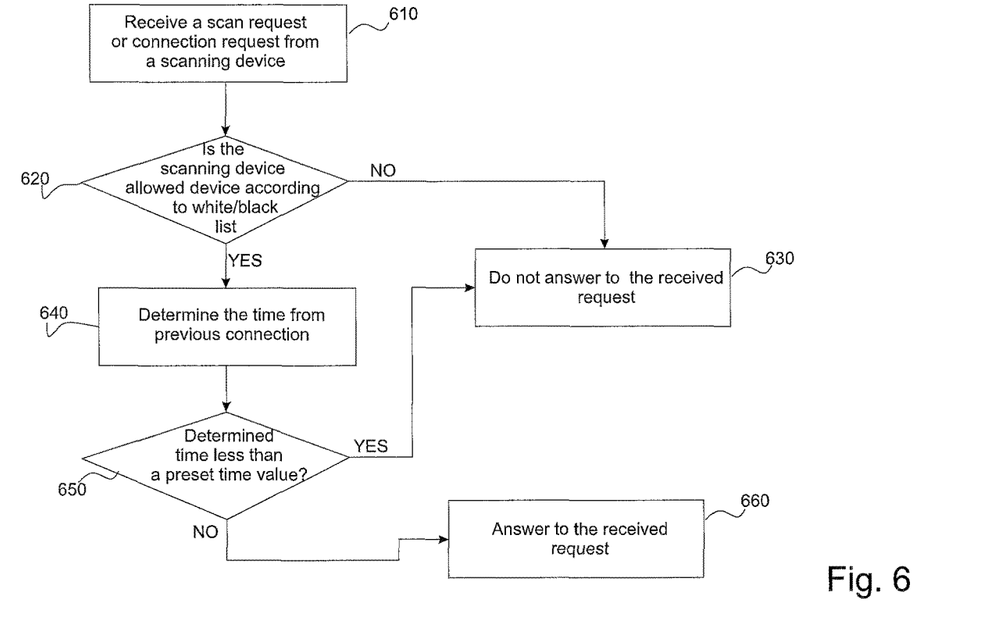
FIG. 6 shows a method according to another embodiment.

FIG. 6 illustrates a flowchart according to another embodiment. In this embodiment, as a response to an advertisement packet, a scan request or connection request is received 610 from a scanning device by an advertising device. The advertising device determines whether or not the scanning device is allowed device according to a white/black list 620. If not 630, the advertising device does not answer the request. If yes 640, then a time from a previous connection of the scanning device to the advertising device is determined. The determined time is compared to a preset time value 650, and if the determined time is less than the preset time value, a respond to the received request is not sent 630. If the determined time is greater than the preset time value, the received request is answered 660.

It is appreciated that the embodiments disclosed with reference to FIGS. 5 and 6 are also applicable in situations, where the scanning device determines whether the advertising device is too far, or whether the time from a previous connection of the advertising device is less than preset time value. Such embodiments are disclosed next with reference to FIGS. 7 and 8.

Figure 7:
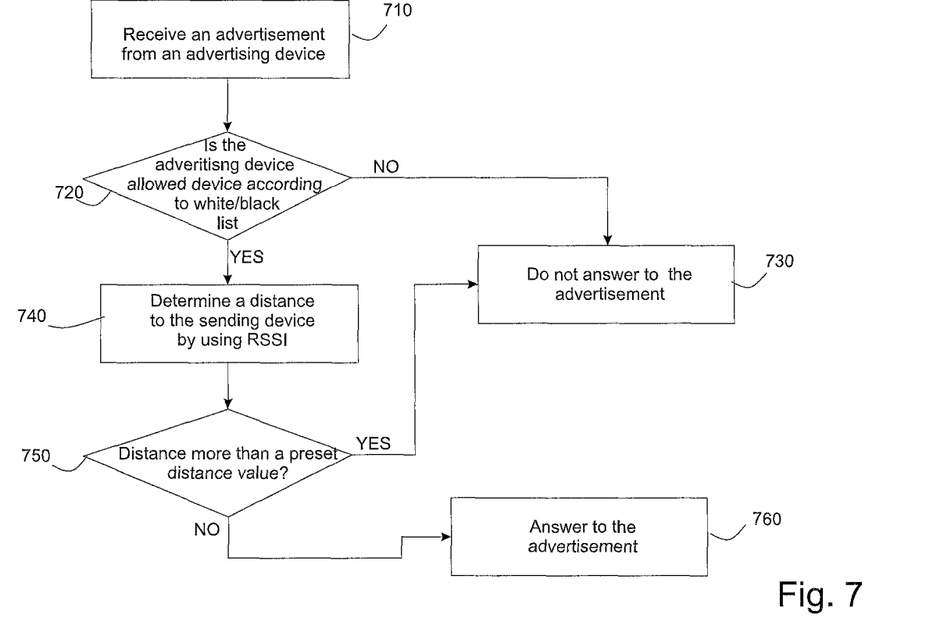
FIG. 7 shows a method according to yet another embodiment.

FIG. 7 illustrates a flowchart according to the embodiment. In this embodiment, an advertisement is received 710 from an advertising device by a scanning device. The scanning device determines whether or not the advertising device is allowed device according to a white/black list 720. If not 730, the scanning device does not answer the request. If yes 740, then a distance between the scanning device and the advertising device is determined by using received signal strength indication. The determined distance is compared to a preset distance value 750, and if the determined distance exceeds the preset distance value, a respond to the advertisement is not sent 730. If the determined distance is smaller than the preset distance value, the advertisement is answered 760.

Figure 8:
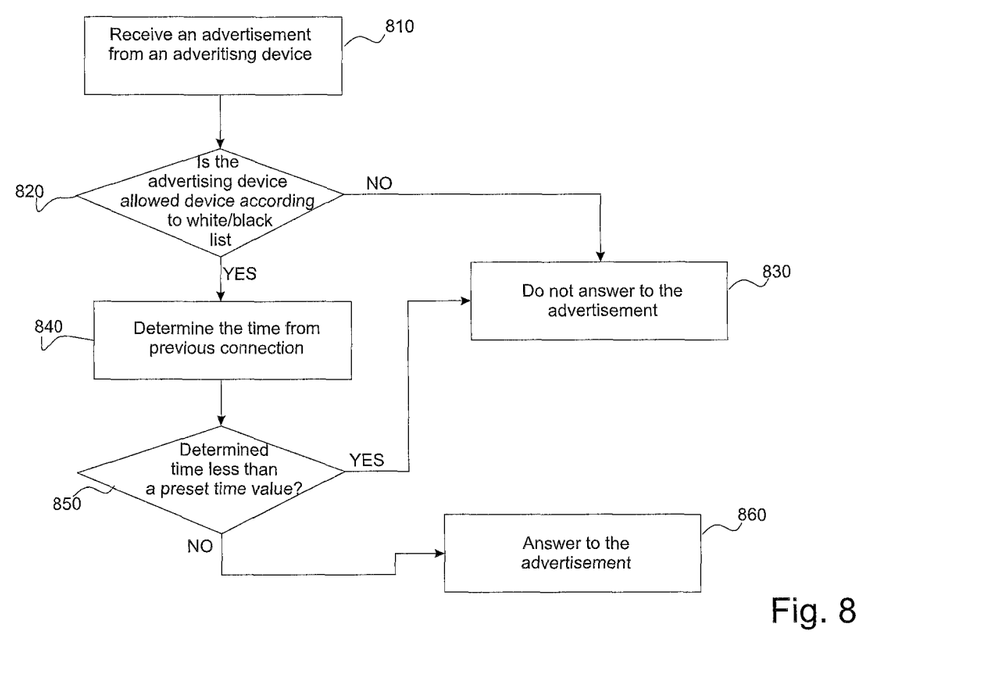
FIG. 8 shows a method according to yet another embodiment.

FIG. 8 illustrates a flowchart according to another embodiment. In this embodiment, an advertisement is received 810 from an advertising device by a scanning device. The scanning device determines whether or not the advertising device is allowed device according to a white/black list 820. If not 830, the scanning device does not answer the request. If yes 840, then a time from a previous connection of the advertising device to the scanning device is determined. The determined time is compared to a preset time value 850, and if the determined time is less than the preset time value, a respond to the advertisement is not sent 830. If the determined time is greater than the preset time value, the advertisement is answered 860.

It is to be noticed that in the previous embodiments (shown in FIGS. 5-8) the use of black/white listing for predetermining the allowance of the device is optional. In the previous embodiments, the RSSI or time is used after it was determined whether the device was allowed according to black/white listing. However, black/white lists may not be used at all. In such embodiments, only RSSI or time is used for determining the allowed device. In addition, the previous embodiments can also be combined. In such an embodiment, at first a device being close enough (FIGS. 5 and 7) is determined, after which the temporal factor is also defined (FIGS. 6 and 8).

In addition, the previous embodiment discloses determining either RSSI or time after the white/black listing is read. However, according to an embodiment, white/black listing is not used at all. In such an embodiment, the filtering is based only on RSSI, on time or on their combination. Yet, according to an embodiment, the filtering may also be based on a data in the packet payload. For example, if the data contains advertising information of which the scanning device is interested in.

The various embodiments may provide advantages. When using extraneous information for device filtering, power can be saved. In addition, multiple devices in crowded environment can be easily filtered in or out.

The various embodiments of the invention can be implemented with the help of computer program code that resides in a memory and causes the relevant apparatuses to carry out the invention.

It is obvious that the present invention is not limited solely to the above-presented embodiments, but it can be modified within the scope of the appended claims.

The invention claimed is:

1. A method of operating a radio apparatus that has at least one processor and memory, the method comprising using the apparatus as a Bluetooth Low Energy (BLE) device to perform the following steps to filter devices before connecting to another BLE device as a slave or a master in a BLE connected state:
   receiving a packet from the other BLE device;
   using the processor of the apparatus to determine whether response to the other BLE device is allowed, wherein the determination comprises at least one of the following:
      determining a time from previous BLE connected state of the apparatus as a slave or a master to the other BLE device, or
      determining information of the data in a payload of the received packet; and
   then either one of:
      sending a packet from the apparatus to the other BLE device if it is determined that response to the other BLE device is allowed, or
      not sending a packet from the apparatus to the other BLE device if it is determined that response to the other BLE device is not allowed.

2. The method according to claim 1, wherein the other BLE device is a scanning device.

3. The method according to claim 2, wherein the received packet is a scan request or a connection request.

4. The method according to claim 1, wherein the other BLE device is an advertising device.

5. The method according to claim 4, wherein the received packet is an advertisement packet.

6. The method according to claim 5, wherein the determination comprises determining a time from previous BLE connected state of the apparatus as a master to the other BLE device; and then not sending a connection request packet or a scan request packet from the apparatus to the other BLE device based on the determined time from previous BLE connected state of the apparatus as a master to the other BLE device.

7. The method according to claim 6, further comprising not sending a connection request packet or a scan request packet from the apparatus to the other BLE device unless the determined time from previous BLE connected state of the apparatus as a master to the other BLE device is from 1 minute to 10 minutes.

8. The method according to claim 1, further comprising determining a received signal strength indication from the received packet, and determining a distance to the other BLE device using the determined received signal strength indication.

9. The method according to claim 1, wherein the determination comprises determining a time from previous BLE connected state of the apparatus as a slave or a master to the other BLE device.

10. The method according to claim 1, wherein the determination comprises determining information of the data in a payload of the received packet.

11. The method according to claim 1, wherein the step of determining whether response to the other BLE device is allowed is performed by a link layer of a controller of the apparatus.

12. The method according to claim 1, further comprising determining whether or not the other BLE device is an allowed device according to a white or black list in addition to the step of determining whether response to the other BLE device is allowed.

13. The method according to claim 1, further comprising not using black or white lists.

14. An apparatus comprising at least one processor and memory, wherein the apparatus is configured to perform the following steps as a Bluetooth Low Energy (BLE) device to filter devices before connecting to another BLE device as a slave or a master in a BLE connected state:
   receive a packet from the other BLE device;
   determine whether response to the other BLE device is allowed, wherein the determination comprises at least one of the following:
      determining a time from previous BLE connected state of the apparatus as a slave or a master to the other BLE device, or
      determining information of the data in a payload of the received packet; and
   then either one of:
      sending a packet from the apparatus to the other BLE device if it is determined that response to the other BLE device is allowed, or
      not sending a packet from the apparatus to the other BLE device if it is determined that response to the other BLE device is not allowed.

15. The apparatus according to claim 14, wherein the other BLE device is a scanning device and the received packet is a scan request or connection request.

16. The apparatus according to claim 14, wherein the other BLE device is an advertising device and the received packet is an advertisement packet.

17. The apparatus according to claim 14, further being configured to determine a received signal strength indication from the received packet, and determine a distance to the other BLE device using the determined received signal strength indication.

18. The apparatus according to claim 14, wherein the determination comprises determining a time from previous BLE connected state of the apparatus as a slave or a master to the other BLE device.

19. The apparatus according to claim 14, wherein the determination comprises determining information of the data in a payload of the received packet.

20. The apparatus according to claim 14, wherein a link layer of the controller of the apparatus is configured to determine whether response to the other BLE device is allowed.

21. The apparatus according to claim 14, wherein the apparatus is configured to not use black or white lists.

22. The apparatus of claim 14, wherein the apparatus is configured to determine whether or not the other BLE device is an allowed device according to a white or black list in addition to the step of determining whether response to the other BLE device is allowed.

23. A computer program product embodied on a non-transitory computer readable medium, comprising computer program code configured to, when executed on at least one processor, cause a radio apparatus to perform the following steps as a Bluetooth Low Energy (BLE) device to filter devices before connecting to another BLE device as a slave or a master in a BLE connected state:

receive a packet from the other BLE device;

determine whether response to the other BLE device is allowed, wherein the determination comprises at least one of the following:

determining a time from previous BLE connected state of the apparatus as a slave or a master to the other BLE device, or determining information of the data in a payload of the received packet; and then either one of:

send a packet from the apparatus to the other BLE device if it is determined that response to the other BLE device is allowed, or not send a packet from the apparatus to the other BLE device if it is determined that response to the other BLE device is not allowed.

\* \* \* \* \*